United States Patent [19]

Nelson

[11] Patent Number: 5,312,779
[45] Date of Patent: May 17, 1994

[54] COLOR SPATIAL LIGHT MODULATOR AND METHOD OF MANUFACTURE

[75] Inventor: William E. Nelson, Dallas, Tex.

[73] Assignee: Texas Instruments Incorporated, Dallas, Tex.

[21] Appl. No.: 888,774

[22] Filed: May 26, 1992

[51] Int. Cl.$^5$ .......................................... H01L 21/302
[52] U.S. Cl. ....................................... 437/225; 437/2; 437/3; 136/256
[58] Field of Search ............................... 437/225, 2, 3; 346/76 L, 76 PH, 160, 108; 136/252, 256, 257

[56] References Cited

U.S. PATENT DOCUMENTS

| | | | |
|---|---|---|---|
| 4,662,746 | 5/1987 | Hornbeck | 350/269 |
| 4,744,073 | 5/1988 | Sugiki | 346/76 L |
| 4,804,977 | 2/1989 | Long | 346/76 L |
| 4,990,930 | 2/1991 | Ludden et al. | 346/76 PH |
| 5,101,236 | 3/1992 | Nelson et al. | 346/160 |
| 5,105,206 | 4/1992 | Sarraf et al. | 346/76 L |
| 5,168,288 | 12/1992 | Baek et al. | 346/76 L |

Primary Examiner—Tom Thomas
Assistant Examiner—Kevin M. Picardat
Attorney, Agent, or Firm—Julie L. Reed; James C. Kesterson; Richard L. Donaldson

[57] ABSTRACT

A semiconductor device comprises a plurality of groups of colored cells controllable by electronic circuitry. Each group of colored cells absorb or reflect specified wavelengths of visible light. The electronic signals control the pathways on which each individual cell reflects incident light. A first process for manufacturing such a color spatial light modulator ("SLM") includes aligning a dye-bearing substrate over the spatial light modulator and causing specified portions of the dye to sublimate off of the substrate and condense onto particular cell elements of the spatial light modulator. A second process for producing a colored spatial light modulator places an electrostatic charge in a dye cloud and introduces the charged cloud to the SLM. The dye migrates to those selected cells containing an opposite electrical charge.

15 Claims, 3 Drawing Sheets

COLOR SPATIAL LIGHT MODULATOR AND METHOD OF MANUFACTURE

TECHNICAL FIELD OF THE INVENTION

This invention relates generally to the field of electronic devices and more particularly to spatial light modulators.

BACKGROUND OF THE INVENTION

Spatial light modulators are active devices having on them at least one row of individually controllable cells. The cells typically reflect along one of two pathways, or select between transmitting and not transmitting light. Electronic signals determine in which mode they operate. Spatial light modulators may also be manufactured with several individual rows of cells or with many rows of tightly spaced cells. The latter format, because of its cell density, is capable of producing images comparable in resolution to monochrome cathode-ray tubes.

The introduction of color to spatial light modulator systems has been problematic to date. One approach to full color systems is to use three spatial light modulators, each with a different primary color source or color filter. The three monochrome modulator images are combined into a single image to produce the desired three color picture. This system has the disadvantages of complex modulator alignment, output convergence, and excessive cost and package size of the related optic system.

The preferred approach to color light modulation, therefore, is to use a single modulator modified to produce the desired color image. Simply aligning a matrix of colored windows above the matrix of individual cells, however, is not satisfactory. The unmodulated light striking a reflective modulator is supplied externally to the individual cells and off of the final viewing optical axis. Incident light therefore passes through the filter window structure twice before being observed by the human eye. The modulated light therefore passes through two different colored window elements. The requisite geometry is prohibitively complex. In transmissive modulator systems similar problems occur. The color filters are typically sandwiched between the transparent panels during manufacture, making the already complex problem even more difficult and lowering yields.

Therefore a need has risen for a single modulator color system which is non-stressing to the individual elements, provides precise and accurate placement of the dye material relative to the cells, and whose dyes have acceptable optical and mechanical properties, and does not affect the steps of the monochrome modulator process.

SUMMARY OF THE INVENTION

In accordance with the present invention, a spatial light modulator is provided which substantially eliminates or reduces disadvantages and problems associated with prior color systems. A semiconductor device is disclosed comprising a plurality of cells and electronic circuitry for controlling the same. The cells are selectively operable to reflect incident light along one of two possible light pathways, or to select between transmitting and not transmitting the light. The cells are divisible into at least two groups. Each group absorbs a particular wavelength or wavelengths of the incident light to produce the characteristic of at least two colors.

One technical advantage of the disclosed invention is the ability to precisely and accurately place colors on individual elements of a spatial light modulator. The particular colors may be arranged so as to create a full color display when viewed at the macroscopic level.

It is another technical advantage that the disclosed process does not interact with the spatial light modulator process chemistry at any level. The coloring process is accomplished by sublimating a dye across a thin air gap from a substrate onto the active surface or surfaces of the modulator. The process is suitable for use with the nearly complete electronic device.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1A:
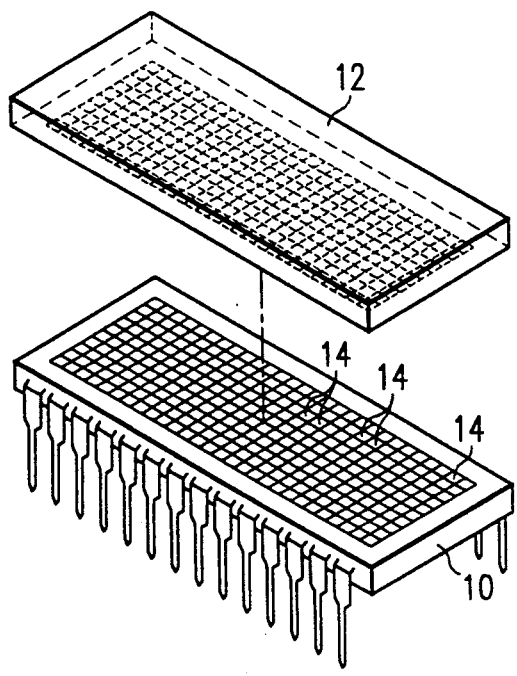
FIGS. 1a-1b depict perspective views of dye-bearing substrates aligned above spatial light modulator arrays.

FIG. 1a shows a reflective area array spatial light modulator ("SLM") 10, below a filter substrate 12. Spatial light modulator 10 is depicted as a rectangular matrix of mirrors 14. Spatial light modulator 10, however, may take any shape, and the mirrors could be any active reflective cell. SLM 10 contains internal circuitry to control along which of two or more pathways each mirror reflects light. Filter substrate 12 contains a sublimable dye on one face. Filter substrate 12 can accommodate any generalized mapping scheme of dye. For instance, the ratio of one color to another may be modified to better suit the response of the human eye or to compensate for color balance in the external light source or in other elements of a related optic system. The sublimable dye is vaporized by the application of heat on the opposite face of substrate 12. The dye then deposits itself on cells 14 as more fully described below. The dye absorbs or reflects a particular wavelength or wavelengths of light to produce the effect of color.

Figure 1B:
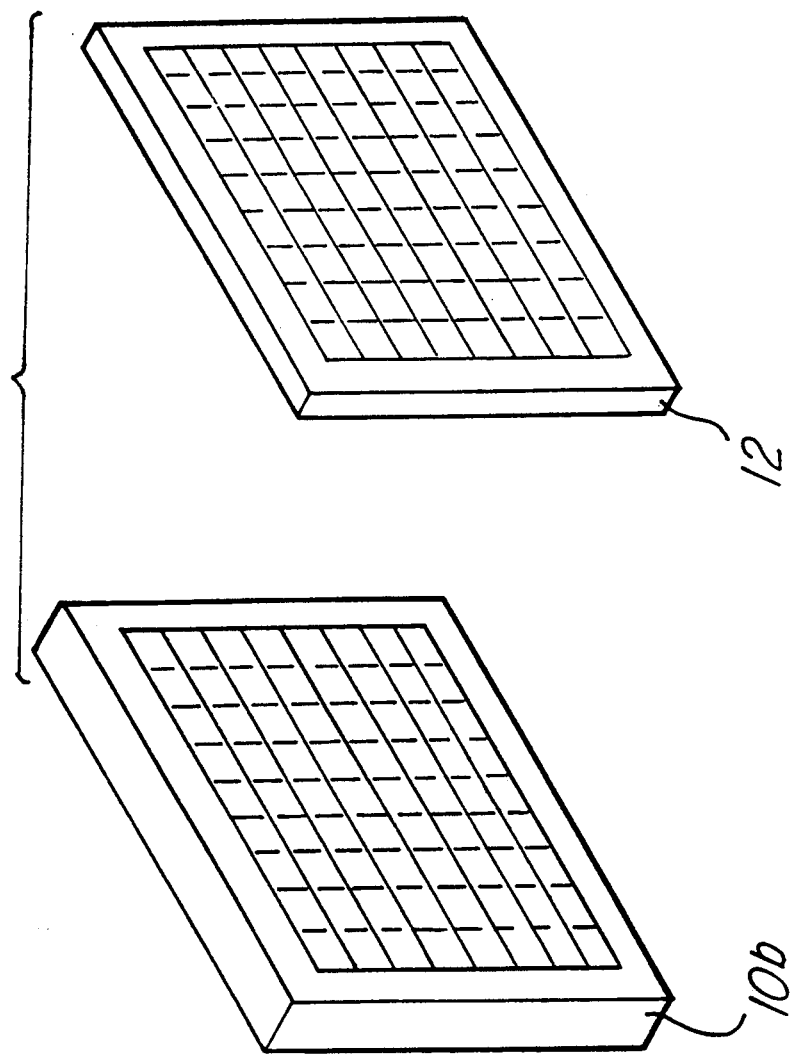

FIG. 1b shows a transmissive modulator 10B such as a liquid crystal device (LCD), with a dye-bearing substrate 12 positioned in front of it. The areas 14 show the active areas of the modulator, typically associated with the transparent electrode in a LCD. In order to avoid confusion, the word cell win herein be used to define this area, whether it is a digital micromirror or some other type of reflective cell, or the active area on a glass panel from a transmissive cell, such as an LCD.

Figure 2:
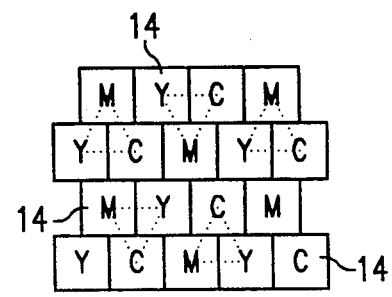
FIG. 2 depicts a diagrammatic view of a typical three-color pattern suitable for creating full color images.

FIG. 2 illustrates one example of a three-color mapping scheme applied to a portion of spatial light modulator 10. In this scheme, "M"=magenta, "Y"=yellow, and "C"=cyan. By staggering the three subtractive primary colors on cells 14 as depicted, three individual mirrors may be operated to produce an individual three-color pixel. Three adjacent cells, as indicated by the overlying triangles, create each full color pixel. FIG. 2 is only a partial representation of spatial light modulator 10.

Figure 3A:
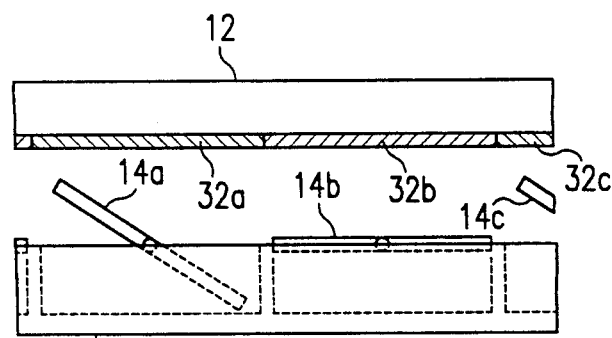
FIGS. 3a and 3b depict cross-sectional side views of a reflective spatial light modulator.
Figure 3B:
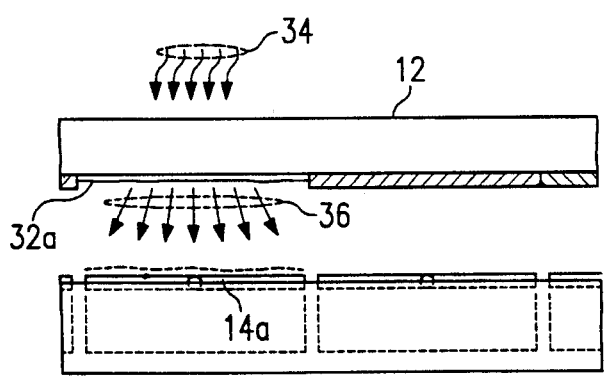

FIGS. 3a and 3b show how a Thermal Dye Sublimation process may be used to apply dye elements 32a, 32b and 32c to mirrors 14a, 14b and 14c on spatial light modulator 10.

In FIG. 3a, substrate 12 may be aligned over spatial light modulator 10 by several means. Alignment may be achieved by using the cells themselves in conjunction with the overlying colored dye elements. When substrate 12 and spatial light modulator 10 are aligned precisely, a certain color pattern can be made to appear by inputting appropriate electronic signals to spatial light modulator 10. Substrate 12 may also be aligned with spatial light modulator 10 by purely mechanical means.

In FIG. 3b, heat (represented by arrows 34) is applied to substrate 12 immediately above color dye element 32a. Color dye element 32a then sublimates (as represented by arrows 36) and deposits onto cell 14a. The resulting intensity of the dye on cell 14a can be controlled by the duration of the application of heat 34 to substrate 12 as well as by controlling the thickness and color of dye element 32a. Substrate 12 is physically separated from spatial light modulator 10 by a small air gap on the order of tens of microns. Ideally, the donor substrate 12 contains a full set of color dyes, but need not. Several sequential applications of different dyes on different substrates 12 to spatial light modulator 10 could result in the full color pixel pattern depicted in FIG. 2 or in any other scheme. In such an application, each color substrate could bear a single sublimable dye for deposit on selected mirrors 14.

One group of dyes suitable for adding the effect of the three subtractive color primaries, magenta, cyan, and yellow, is known as dye diffusion thermal transfer ("D2T2") dyes. This group of dyes is also used for printing processes. These dyes sublime at fairly high temperatures of the order of 300° C. to 400° C., making them suitable for SLM application where the device may operate at 75° C. to 100° C. for extended periods. The D2T2 dyes are designed to be light-fast, another requirement for the SLM application due to the anticipated period of exposure to illumination. Typical photographic dyes used for color charge-coupled device filters, or polyester textile dyes, do not meet these criteria. D2T2 dyes also adhere well to the smooth aluminum SLM pixel surface, having a polar group to form an attractive bond.

In particular, the yellow dye, for example, may be selected from the methine and azopyridone classes of D2T2 dyes. For magenta, the heterocyclic azo and tricyanovinyl dyes are suitable. Suitable cyan dyes exist in the heterocyclic azo series, as well as in the phenylazoheterocyclic azo series.

The heat necessary to sublimate dye element 32a in FIG. 3b may be provided by a thermal print head similar to those used in thermal printers, or by a scanning laser.

Figure 4:
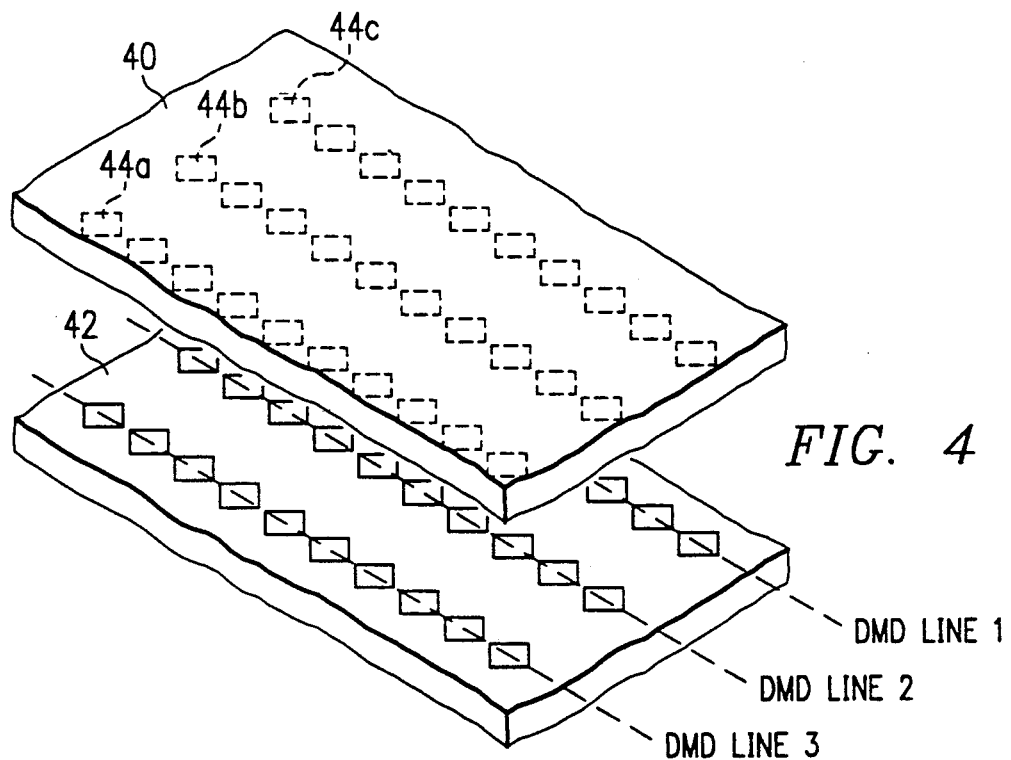
FIG. 4 depicts a perspective view of a second dye-bearing substrate and spatial light modulator.

FIG. 4 illustrates application of the disclosed process to linear-array spatial light modulator chips requiring multi-color or single-color pixels. Substrate 40 is aligned over chip 42 containing three rows of individual mirrors labeled "SLM line 1", "SLM line 2" and "SLM line 3". Substrate 40 contains three rows of dye elements 44a, 44b and 44c. Lines 44a, 44b and 44c may be magenta, yellow, and cyan dyes, respectively, or may be any other combination.

Dye element rows 44a, 44b and 44c are sublimated onto SLM lines 1, 2 and 3 as explained in connection with FIG. 3b.

Figure 5:
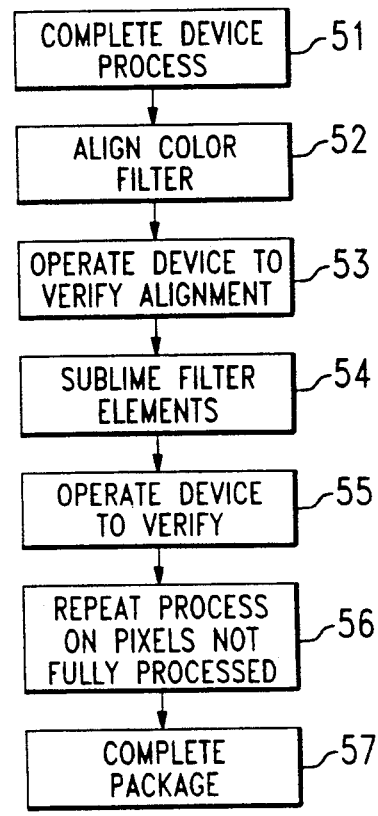
FIG. 5 depicts a flow diagram of the process of the preferred embodiment.

FIG. 5 illustrates a flow chart of the process for sublimating color dye onto a spatial light modulator. The individual spatial light modulator chip is initially fabricated in Complete Chip Process block 51. At this point, all of the individual cells on the completed spatial light modulator reflect or transmit the same color or colors.

A substrate containing the sublimable dye is then aligned approximately a few tens of microns above the spatial light modulator chip and is aligned in the "X" and "Y" axes such that each dye element is over the desired cell (block 52). The spatial light modulator is electronically linked to a microprocessor in block 53. There, the microprocessor generates an electronic signal that causes the spatial light modulator chip to align certain cells along the second of the possible optical axes of the spatial light modulator, or allow the modulator to transmit light. A human operator or machine vision system can then verify the alignment of the substrate and chip by comparing the image produced with that of a reference image. In particular, substrate 12 (FIGS. 1a, 1b, 3a, and 3b) might be partially transparent to allow the produced image to pass through substrate 12. Other suitable methods could also be used to align the dye substrate and spatial light modulator.

In block 54, the dye elements are sublimated onto the spatial light modulator chip by the application of heat as described with respect to FIG. 3b. The microprocessor then generates a second set of signals to insure that each individual cell reflects or transmits the desired color in block 55. For example, all cells of a particular color might be "turned on" to reflect light along the same pathway at the same time. A machine vision system or human operator could then inspect the SLM for any cell reflecting or transmitting a color other than that selected. Those spatial light modulators with no color or with an incorrect color may then be reprocessed in block 56. The cells with an incorrect color may be scanned directly with a laser to resublimate the color dye element off of the cell. Cells that have no color or that were subject to the previous corrective action may then be realigned with the same filter substrate or with another filter substrate to reapply the desired color. The steps represented by block 52-56 may be repeated as necessary if additional colors on other substrates need to be sublimated onto the SLM.

The spatial light modulator chip is then completed in block 57 as required by the ultimate electronic system. The spatial light modulator, for instance, might be inserted into a visual display device.

Figure 6:
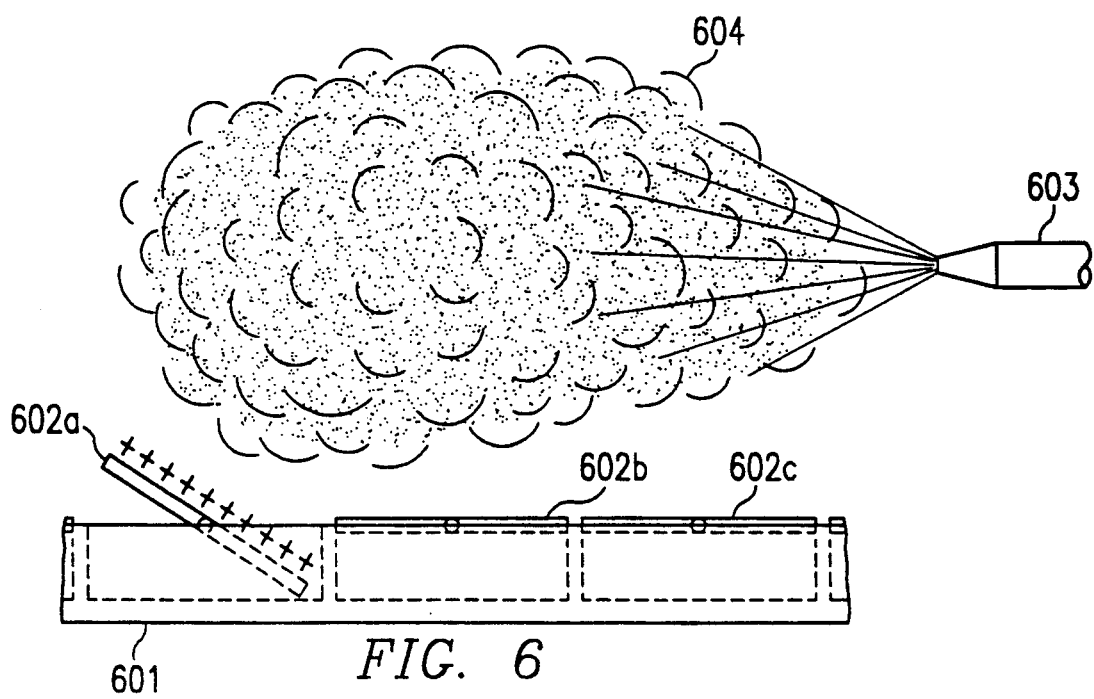
FIG. 6 depicts a second embodiment of the disclosed invention.

FIG. 6 depicts an electrostatic spray painting scheme for dyeing individual cells on a spatial light modulator chip. The electrostatic scheme is applicable to devices that are electrostatically charged when activated to reflect or transmit light along a particular axis. Spatial light modulator 601 contains individual cells 602a, 602b and 602c. A nozzle 603 atomizes and electrostatically charges a color dye 604 such as a D2T2 dye.

Cell 602a is activated by electronic signals (not shown) to reflect or transmit light along a second optical axis. One consequence of the activation of cell 602a is the occurrence of an electrostatic charge along the surface of cell 602a. Cell 602a can therefore be colored while cell 602b and 602c remain in their original state. Nozzle 603 atomizes color dye 604. Color dye 604 is produced with a particular electrostatic charge. Here, dye 604 is produced with a negative charge because cell 602a has a positive electrostatic charge on its surface. The electrostatic charge on cell 602 could as easily be a negative charge in which case dye cloud 604 would be positively charged by nozzle 603. Dye cloud 604 is then combined with spatial light modulator 601. Color dye 604 is electrically attracted to selected cell 602a. A portion of color dye 604 then deposits on cell 602a. Cells 602b and 602c are not coated with dye from dye cloud 604 because they are electrostatically neutral.

Other cells on spatial light modulator 601 could be coated with other colors by successively charging them (activating them to reflect or transmit light along a certain axis) and combining them with other oppositely charged dye clouds. In such a way any color pattern, including the one depicted in FIG. 2, could be deposited on spatial light modulator 601.

Although the present invention and its advantages have been described in detail, it should be understood that various changes, substitutions and alterations can be made herein without departing from the spirit and scope of the invention as defined by the appended claims.

What is claimed is:

1. A process of applying color to at least one selected cell element of a spatial light modulator comprising the steps of:
   a. aligning a substrate containing a color dye adjacent to the spatial light modulator;
   b. sublimating the color dye onto at least one cell on the spatial light modulator;
   c) generating a pattern of cells in said spatial light modulator; and
   d) verifying that only said selected one received said dye.

2. The process of claim 1 wherein said aligning step comprises the step of aligning a substrate comprising a plurality of color dye elements adjacent to the spatial light modulator.

3. The process of claim 2 wherein said aligning step comprises the step of aligning a substrate comprising color dye elements which form three color pixels of magenta, yellow, and cyan.

4. The process of claim 1 wherein said aligning step comprises the step of aligning a substrate comprising at least one single color row of dye.

5. The process of claim 1 wherein said sublimating step comprises heating the dye with a laser.

6. The process of claim 1 wherein said sublimating step comprises of heating the dye with a thermal print head.

7. A process of applying color to a spatial light modulator, comprising the steps of:
   a. aligning at least one substrate containing at least one color dye adjacent to the spatial light modulator;
   b. applying heat to the substrate; and
   c. sublimating said at least one dye onto a group of cells on the spatial light modulator, such that each said dye has a corresponding exclusive set of selected cells.

8. The process of claim 7 further comprising the step of mapping the first, second, and third substrates of color dyes onto the first, second, and third group of cells to produce three-color pixels.

9. The process of claim 8 wherein each of said aligning steps further comprise the step of aligning a substrate containing dye selected from the group consisting of methine, azopyridone, heterocyclic azo, tricyanovinyl, heterocyclic azo, phenylazoheterocyclic azo and mixtures thereof.

10. The process of claim 7 wherein the substrate contains three-color pixels.

11. The process of applying color to a spatial light modulator comprising the steps of:
   a. applying an electrical charge to a selected first group of cells of a spatial light modulator;
   b. applying an opposite electrical charge to a first dye; and
   c. combining the first dye with the spatial light modulator.

12. The process of claim 11 further comprising the steps of:
   a. applying an electrical charge to a selected second group of cells;
   b. applying an opposite electrical charge to a second dye; and
   c. combining the second dye with the spatial light modulator.

13. The process of claim 12 further comprising the steps of:
   a. applying an electrical charge to a selected third group of cells;
   b. applying an opposite electrical charge to a third dye; and
   c. combining the third dye with the spatial light modulator.

14. The process of claim 13 further comprising the step of mapping the first, second, and third groups of cells to produce three-color pixels.

15. The process of claim 13 wherein each of said combining steps further comprises the step of combining a spatial light modulator with a dye selected from the group consisting of methine, azopyridone, heterocyclic azo, tricyanovinyl, heterocylic azo, phenylazoheterocyclic azo and mixtures thereof.

* * * * *